United States Patent [19]
Mitra et al.

[11] Patent Number: 5,386,526
[45] Date of Patent: Jan. 31, 1995

[54] CACHE MEMORY CONTROLLER AND METHOD FOR REDUCING CPU IDLE TIME BY FETCHING DATA DURING A CACHE FILL

[75] Inventors: Samir Mitra, Milpitas; Renukanthan Raman, Sunnyvale; Joseph Petolino, Palo Alto, all of Calif.

[73] Assignee: Sun Microsystems, Inc., Mountain View, Calif.

[21] Appl. No.: 779,388

[22] Filed: Oct. 18, 1991

[51] Int. Cl.⁶ .................. G06F 12/06; G06F 13/00
[52] U.S. Cl. .................. 395/400; 395/425; 364/DIG. 1
[58] Field of Search .................. 395/425, 400; 364/DIG. 1

[56] References Cited

U.S. PATENT DOCUMENTS

| | | | |
|---|---|---|---|
| 4,691,277 | 9/1987 | Kronstadt et al. | 395/400 |
| 4,912,631 | 3/1990 | Lloyd | 395/425 |
| 4,994,962 | 2/1991 | Mageau et al. | 395/425 |
| 5,073,851 | 12/1991 | Masterson et al. | 395/425 |
| 5,148,536 | 9/1992 | Witek et al. | 395/425 |
| 5,185,871 | 2/1993 | Frey et al. | 395/375 |
| 5,210,845 | 5/1993 | Crawford et al. | 395/425 |
| 5,247,643 | 9/1993 | Shottan | 395/425 |

FOREIGN PATENT DOCUMENTS 0412247 9/1990 European Pat. Off. .

OTHER PUBLICATIONS

"Integrated Cache Architecture Optimizes System Bus Performance", Ron Lucier; publication of the Electro 1988 Conference Record, May 10, 1988, Los Angeles, Calif., 54/3, pp. 1-6.

Primary Examiner—Glenn Gossage
Attorney, Agent, or Firm—Blakely Sokoloff Taylor & Zafman

[57] ABSTRACT

A cache memory controller and an associated method for fetching data are utilized to reduce the idle time of a central processing unit (CPU) of a computer system. Control circuitry and a plurality of cache fill status registers are provided to a cache controller to enable a data word to be fetched and returned to the CPU while a cache memory fill initiated due to a prior cache miss is still in progress. The data word is returned if the data word is stored in a main memory location which corresponds to a memory block offset of a main memory block frame currently being mapped into the cache memory. The data word is retrieved and returned to the CPU simultaneous with its writing into the cache memory, if the data word has not been written into the cache memory; otherwise, the data word is retrieved and returned to the CPU at the next dead cycle. As a result, CPU idle time due to cache read misses is reduced.

34 Claims, 4 Drawing Sheets

CACHE MEMORY CONTROLLER AND METHOD FOR REDUCING CPU IDLE TIME BY FETCHING DATA DURING A CACHE FILL

BACKGROUND OF THE INVENTION

1. Field of the Invention

The present invention relates to the field of computer systems. More particularly, the present invention relates to a cache memory controller and method for fetching data for a central processing unit (CPU) that reduces CPU idle time.

2. Art Background

Typically the central processing unit (CPU) in a computer system operates at a substantially faster speed than the main memory. In order to avoid having the CPU idle too often while waiting for data or instructions from the main memory, a cache memory which can operate at a higher speed than the main memory is often used to buffer data and instructions between the main memory and the CPU. The data and instructions in memory locations of the main memory are mapped into the cache memory in block frames. Each block frame comprises a plurality of block offsets corresponding to a plurality of memory locations storing a plurality of the data and instructions. To further improve the overall CPU performance, some computer systems employ separate cache memories, one for data and one for instructions.

However, the use of separate cache memories does not solve the problem entirely. When a cache read miss occurs, that is, when the datum or instruction requested by the CPU is not in the cache memory, the cache memory has to retrieve the datum or instruction from the main memory. To do so, typically the entire block frame of data or instructions comprising the requested datum or instruction is retrieved; and the CPU goes idle until the retrieval is completed. For other cache performance problems and improvement techniques, see *J. L. Hennessy*, and *D. A. Patterson, Computer Architecture-A Quantitative Approach*, pp. 454–461, (Morgan Kaufmann, 1990).

The amount of time it takes to fill the cache memory with a replacement block frame is dependent on the block size and the transfer rate of the cache memory-main memory hierarchy. For example, if the block size is eight (8) words and the speed of the main memory is two (2) block offsets per three (3) clock cycles, then it takes eleven (11) clock cycles to fill the cache memory with the replacement block frame. Reducing the block frame size or filling a partial block on a cache read miss does not necessarily reduce the CPU idle time, since it will increase the likelihood of future cache read misses.

Various techniques have been used to minimize the amount of CPU idle time waiting for the cache memory when cache read misses occur. One common practice is early restart, that is, as soon as the requested datum or instruction arrives, it is sent to the CPU without waiting for the writing of the entire block to be completed. Therefore, the CPU may resume its execution while the rest of the replacement block frame is being written.

A further refinement of the early restart technique is out of order fetch which is a request to the main memory to retrieve the requested datum or instruction first, skipping all the data or instructions before the requested datum or instruction in the replacement block frame. Like the early restart, the retrieved datum or instruction is sent to the CPU as soon as it is retrieved. Again, the CPU may resume its execution while the rest of the replacement block frame is being retrieved. After retrieving the requested datum or instruction, the main memory continues to retrieve the remaining data and instructions in the replacement block frame, starting with the data and instruction after the requested datum or instruction, and loops around to retrieve the previously skipped data or instructions at the beginning of the block frame, until the end of the block frame is reached. Thus, the CPU can resume execution as soon as the first datum or instruction is retrieved from the main memory.

However, because handling subsequent requests from the CPU while trying to fill the rest of the replacement block frame gets complicated quickly, the CPU typically goes idle again after the datum or instruction is executed, and waits for the remaining retrievals to be completed. The CPU goes idle and waits, even if the datum instruction subsequently requested by the CPU is already in the cache memory or is part of the replacement block frame currently being retrieved. Thus, the benefits from early restart and out of order fetch are limited, especially if the CPU is likely to complete its execution before the rest of the replacement block frame is written to the cache memory. This is especially likely to occur on computer systems where the number of clock cycles required to execute a typical instruction is small, for example, reduced instruction set computer (RISC) systems.

Since the cache memory typically operates at a higher speed than the main memory, there are dead cycles where the cache memory is waiting for data or instructions to be transferred from the main memory, while the CPU is waiting for the cache memory. The number of dead cycles is also dependent on the block frame size and the transfer rate of the cache memory-main memory hierarchy. In the example discussed above, there are three (3) dead cycles per writing of a block frame, one in every three clock cycles. Therefore, subsequent requests for data or instructions that are in the cache memory can be satisfied during these dead cycles, thereby further reducing CPU idle time. The problem is knowing that the data or instructions are in the cache memory and synchronizing their read out from the cache memory to these dead cycles, without substantial investment in additional hardware.

Likewise, to satisfy the subsequent requests for data or instructions that are in the process of being retrieved from the main memory, problem is knowing when the data or instructions are retrieved and synchronizing their direct transfer to the CPU with their retrieval, without substantial investment in additional hardware.

As will be described, the present invention overcomes the disadvantages of the prior art, and provides a cache memory controller and method for fetching data for a CPU that reduces CPU idle time.

SUMMARY OF THE INVENTION

It is therefore an object of the present invention to provide a cache memory controller and method for fetching data for a central processing unit (CPU) that reduces CPU idle time.

It is an object of the present invention to retrieve and return data being fetched by the CPU during a cache memory fill without having the CPU remain idle waiting for the cache memory fill to complete, if the data being fetched is part of the memory block frame currently being mapped.

In the present invention, if the CPU fetches data during a cache memory fill and the data being fetched are part of the memory block frame currently being filled, the data are retrieved and returned to the CPU simultaneous with their writing into the cache memory, if the data have not been written into the cache memory; otherwise, the data are retrieved and returned to the CPU at the next dead cycle, since the data have already been written into the cache memory.

A control circuit is used to determine if a cache memory fill is in progress, and if one is in progress, determine if the data being fetched are part of the memory block frame being filled, and if they are part of the memory block frame, determine if the data have been written, and if the data have not been written, determine if the data are to be written next.

A plurality of fill registers are used to keep track of the memory block frame currently being mapped, memory block offsets of the memory block frame currently being mapped, and the memory block offset of the next memory block frame to be mapped, thereby allowing the control circuit, in conjunction with the fill registers, to make the above determinations.

Based on the results of the above determinations, the control circuit sends appropriate signals to the cache memory, the main memory and the CPU at the appropriate times, thereby causing the data to be fetched and returned to the CPU as desired. The control circuit detects the appropriate timings using its internal control states.

BRIEF DESCRIPTION OF THE DRAWINGS

The objects, features and advantages of the present invention will be apparent from the following detailed description of the preferred embodiment of the invention with references to the drawings in which.

DETAILED DESCRIPTION OF THE INVENTION

A cache memory controller and method for fetching data for a central processing unit (CPU) that reduces CPU idle time is disclosed. In the following description for purposes of explanation, specific numbers, materials and configurations are set forth in order to provide a thorough understanding of the present invention. However, it should be apparent to one skilled in the art that the present invention may be practiced without these specific details. In other instances, well known systems are shown in diagrammatical or block diagram form in order not to obscure the present invention unnecessarily.

Figure 1:
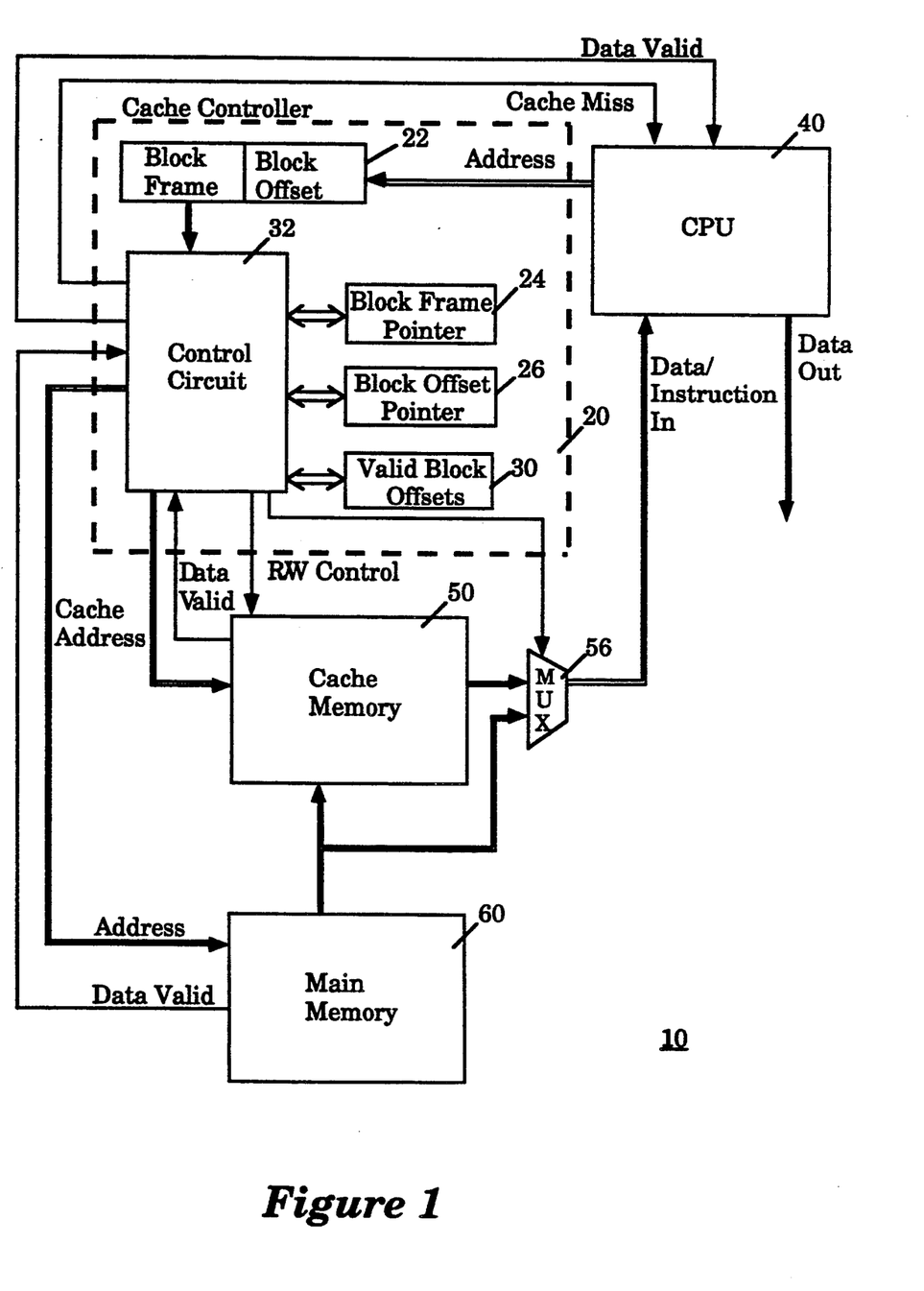
FIG. 1 shows a block diagram illustrating the cache memory controller of the present invention for fetching data for a central processing unit (CPU).

Referring now to FIG. 1, a block diagram illustrating the preferred embodiment of the cache memory controller of the present invention that reduces CPU idle time is shown. The cache memory controller (CMC) 20 is shown in the context of a typical computer system 10 comprising a central processing unit (CPU) 40, cache memory 50 and main memory 60 with early restart and out of order fetch capability.

The main memory 60 comprises a plurality of memory locations (not shown) for storing a plurality of data words. The memory locations are organized into a plurality of memory block frames with each memory block frame having $n_1$ memory block offsets corresponding to $n_1$ memory locations. Each memory location is referenced by a memory address having a plurality of ordered bits, with the high order bits referencing its memory block frame and the low order bits referencing its memory block offsets.

The cache memory 50 comprises a plurality of cache locations (not shown). The cache locations are organized into a plurality of cache frames for mapping at least one of the memory block frames. Each of the cache frames comprises $n_1$ cache offsets for mapping the $n_1$ memory block offsets of one of the memory block frames, and a cache tag indicating the memory block frame being mapped by the particular cache frame. Each cache location is referenced by a cache address having a plurality of ordered bits, with the high order bits referencing its cache frame and the low order bits referencing its cache offsets.

Each memory block frame is mapped into a cache frame during a cache memory fill initiated due to receiving a memory address referencing a memory block frame and one of its memory block offsets that resulted in a cache read miss. The data words stored in the memory locations corresponding to the memory offsets of the referenced memory block frame are written into the cache locations corresponding to the cache offsets of the mapping cache frame. The data word stored in the memory location corresponding to the memory offset referenced by the memory address that resulted in the cache read miss is written into its mapping cache location first (out-of-order fetch). The data words are written into the cache locations in multiple bursts of $n_2$ data words per $n_3$ clock cycles, where $n_1$ is divisible by $n_2$, thereby resulting in $n_4$ dead cycles per $n_3$ clock cycles during each cache memory fill.

For a further description of mapping memory block frames and memory block offsets of a main memory into cache frames and cache offsets of a cache memory, see J. L. Hennessy, and D. A. Patterson, *Computer Architecture-A Quantitative Approach*, pp. 454–461, (Morgan Kaufman, 1990).

Continuing referring to FIG. 1, the CMC 20 comprises an address register 22 coupled to the CPU 40, a plurality of fill registers 24, 26 and 30, and a control circuit 32 coupled to the address register 22, the fill registers 24, 26 and 30, the CPU 40, the cache memory 50, and the main memory 60.

The address register 22 coupled to the CPU is for storing a memory address received from the CPU. The memory address indicates a memory location where a data word being fetched by the CPU is stored.

The fill registers 24, 26 and 30 store the status of mapping one of the memory block frames from the main memory 60 into the cache memory 50. The fill registers 24, 26 and 30 comprise three registers for holding a memory block frame fill pointer, a memory block offset fill pointer, and a plurality of valid memory block offset fill bits.

The memory block frame fill register 24 coupled to the control circuit 32 stores a memory block frame fill pointer pointing to the memory block frame whose memory block offsets are currently being mapped from the main memory 60 into the cache memory 50. The memory block frame fill pointer is initialized by the control circuit 32 to the higher order bits of the memory address referencing the memory block frame being mapped, at the beginning of a cache memory fill.

The memory block offset fill register 26 coupled to the control circuit 32 stores a memory block offset fill pointer pointing to the next block offset being mapped from the main memory 60 into the cache memory 50. The memory block offset pointer is initialized by the control circuit 32 to the lower order bits of the memory address referencing the first block offset being written, at the beginning of a cache memory fill. Additionally, the memory block offset fill pointer is updated by the control circuit 32 to the lower order bits of the memory address referencing the next block offset being written, after each memory block offset is mapped into the cache memory 50.

The valid block offsets fill register 30 coupled to the control circuit 32 is for storing a vector of valid memory block offset fill bits indicating whether each of the memory block offsets of the memory block frame being mapped has been mapped. The valid memory block offset bits are initialized by the control circuit 32 to binary zeros, at the beginning of a cache memory fill. Additionally, the valid memory block offset bits are set individually by the control circuit 32 to binary ones after each of the corresponding memory block offsets is mapped.

The control circuit 32 is coupled to the address register 22, the fill registers 24, 26 and 30, the CPU 40 the cache memory 50 and the main memory 60. The control circuit 32 determines whether a cache memory fill initiated due to a prior cache read miss, which resulted from a previously received memory address from the CPU 40, is still in progress, the previously received memory address having been subsequently served. The control circuit 32 also determines whether the currently received memory address from the CPU 40 results in a cache read miss. Additionally, the control circuit 32 controls the sending of appropriate signals at the appropriate time, so that the data word being fetched by the CPU 40 is retrieved from the cache-main memory hierarchy 50, 60 and returned to the CPU 40.

Figure 2A:
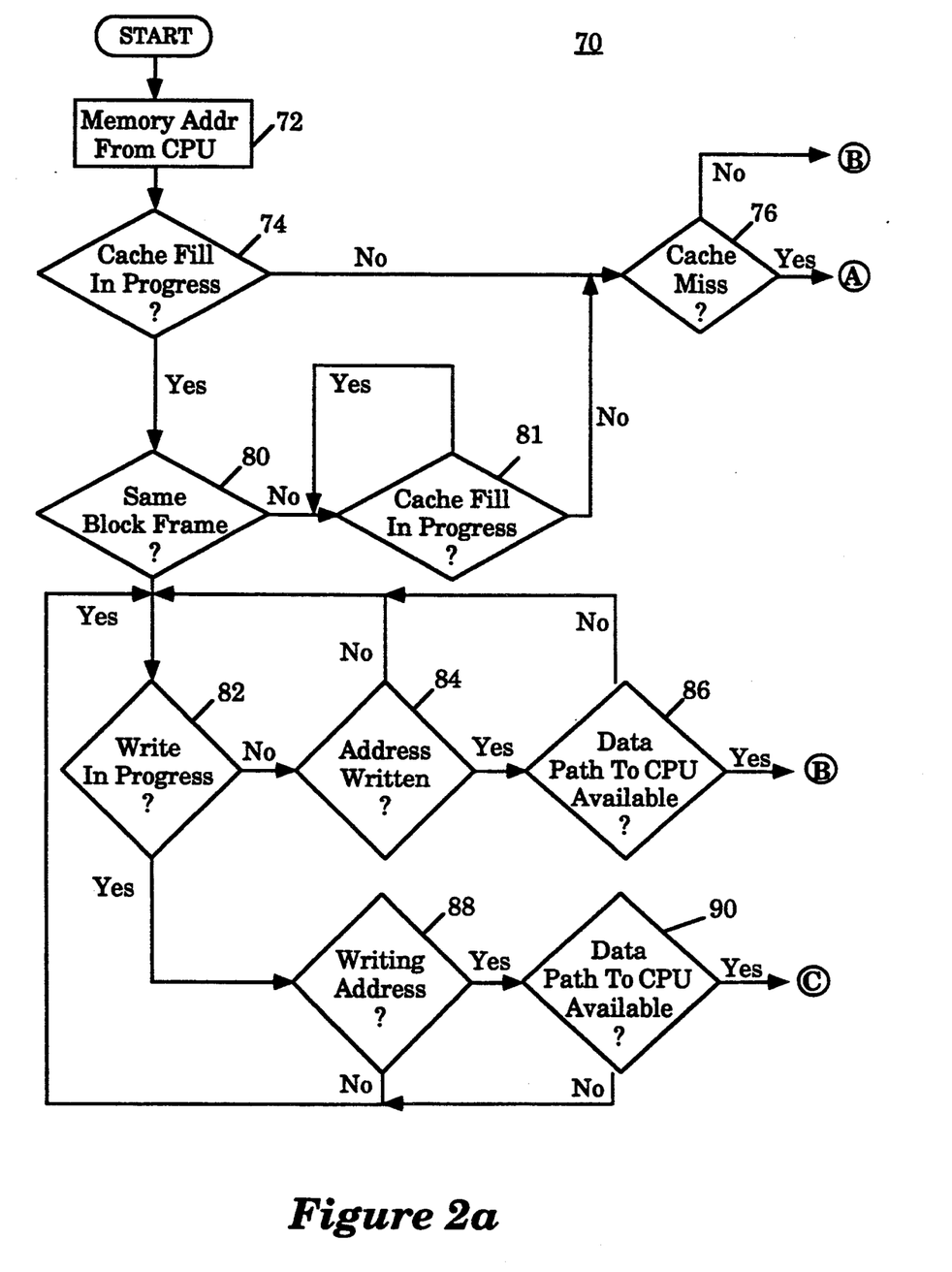
FIG. 2 shows a block diagram illustrating the operational flow of the control circuit of the cache memory controller of the present invention.
Figure 2B:
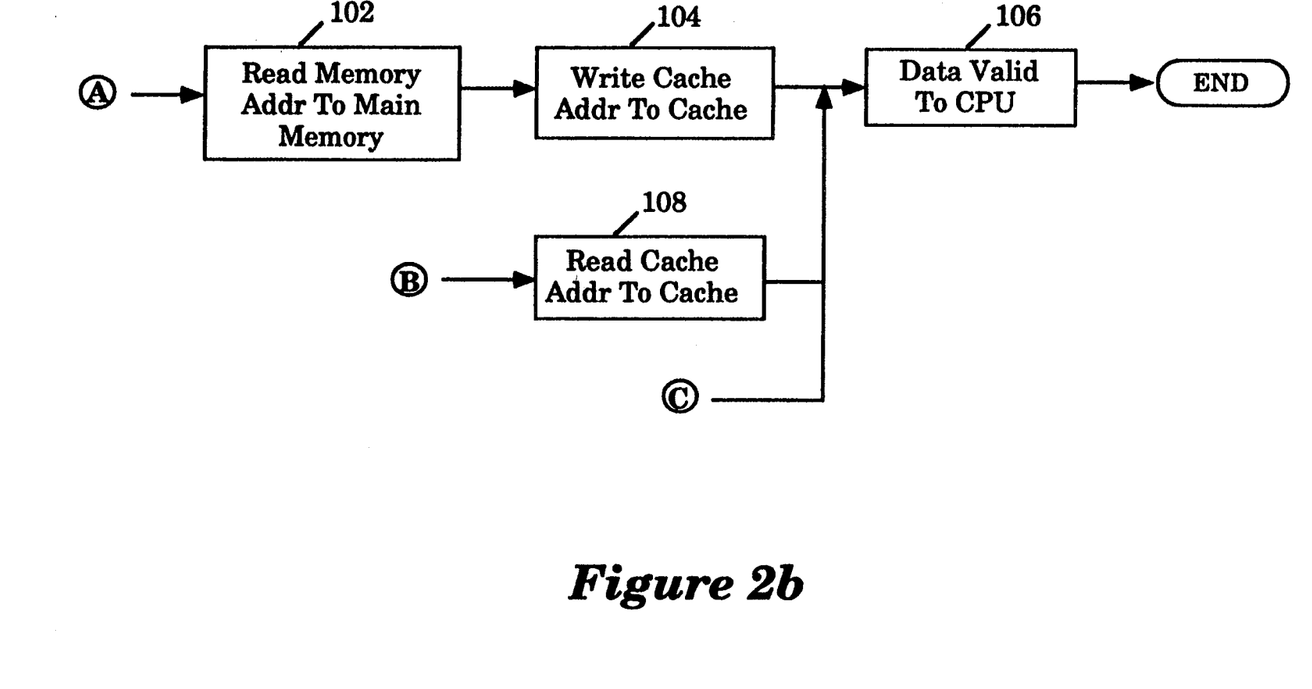

Referring now to FIG. 2, a block diagram illustrating the operational flow of the control circuit of the present invention is shown. The control circuit is coupled to the address register and receives the memory address of the data word being fetched by the CPU as input (step 72). Upon receipt of the memory address being fetched, the control circuit determines whether the cache memory is being filled (step 74). The control circuit determines whether the cache memory is being filled based on its internal state, which will be described in further detail later.

If the cache memory is not being filled, the control circuit determines whether the memory address received results in a cache miss (step 76). The control circuit, being coupled to the address register 22, makes the determination by accessing the cache tags in the cache frames of the cache memory and comparing them against the high order bits of the memory address received.

If the high order bits of the memory address received match one of the cache tags (i.e. cache being idle and cache read hit), the control circuit sends a read signal and a corresponding cache address to the cache memory (step 108), thereby causing the cache memory to retrieve the data word being fetched from its cache location and return it to the CPU. Simultaneously, the control circuit sends a data valid signal to the CPU (step 106), thereby causing the CPU to accept the data word being returned by the cache memory.

If the high order bits of the memory address received do not match any of the cache tags (i.e. cache being idle and cache read miss), the control circuit sends a read signal and the memory address received to the main memory (step 102). This causes the main memory to provide to the cache memory and the CPU simultaneously, the data words stored in the memory locations corresponding to the memory block offsets of the memory block frame referenced by the high order bits of the memory address received. The control circuit further sends a write signal and corresponding cache addresses for the mapping cache frame to the cache memory (step 104), thereby causing the cache memory to store the data words being provided into the cache locations corresponding to the cache offsets of the mapping cache frame. Simultaneously, the control circuit also sends a data valid signal to the CPU (step 106), thereby causing the CPU to accept the first data word being returned by the main memory (i.e. the data word being fetched by the CPU).

If the cache memory is being filled, the control circuit also determines whether the high order bits of the memory address received reference the same memory block frame currently being mapped (step 80). The control circuit, which is also coupled to the memory block frame fill register, makes the determination by accessing the memory block frame pointer in the memory block frame fill register, and comparing it against the high order bits of the memory address received.

If the high order bits of the memory address received do not reference the same memory block frame currently being mapped, the control circuit waits until the cache memory fill in progress is completed (step 81). As described earlier, the control circuit determines whether the cache memory fill in progress is completed based on its internal state.

Upon completion of the cache memory fill, the control circuit handles the memory address received in the same manner as if the memory address were received while the cache memory was not being filled.

If the high order bits of the memory address received reference the same memory block frame concurrently being filled, the control circuit determines if memory block offsets are actually being mapped into the corresponding cache offsets (i.e., cache fill in progress, non-dead cycles) step 82. The control circuit also determines whether memory block offsets are actually being mapped into the corresponding cache offsets based on its internal state.

If memory block offsets are not actually being mapped into the corresponding cache offsets (i.e., cache fill just completed, or cache fill still in progress and dead cycle), the control circuit further determines if the lower order bits of the memory address received reference a memory block offset (of the memory block frame currently being mapped) that has been mapped (step 84). The control circuit, which is also coupled to the valid block offsets fill register, makes the determination by accessing the valid block offsets in the valid block offsets fill register, and comparing them against the memory block offset referenced by the lower order bits of the memory address received.

If the lower order bits of the memory address received do not reference a memory block offset (of the memory block frame currently being mapped) that has been mapped, the control circuit again determines if memory block offsets are actually being mapped into the corresponding cache offsets (i.e., cache fill in progress, non-dead cycle), step 82, at the next clock cycle, as described earlier.

If the lower order bits of the memory address received reference a memory block offset of the memory block frame currently being mapped that has been mapped, the control circuit determines if a data path to the CPU is available (step 86). The control circuit, being coupled to the data path, makes the determination by checking if the data path is being held.

If the data path to the CPU is not available, the control circuit again determines if memory block offsets are actually being mapped into the corresponding cache offsets (i.e., cache fill in progress, non-dead cycle), step 82, at the next clock cycle, as described earlier.

If the data path to the CPU is available, the control circuit sends a read signal and a corresponding cache address to the cache memory (step 108), thereby causing the cache memory to retrieve the data word being fetched from its cache location and return it to the CPU. Simultaneously, a data valid signal is also sent to the CPU (step 106), thereby causing the CPU to accept the data word being provided by the cache memory.

If memory block offsets are actually being mapped into the corresponding cache offsets (i.e., cache fill in progress, non-dead cycle), step 82, the control circuit further determines if the memory block offset referenced by the lower order bits of the memory address received is the memory block offset currently which is mapped (step 88). The control circuit, being coupled to the block offset fill register caches, makes its determination by accessing the memory block offset pointer in the memory block offset fill register, and comparing it against the lower order bits of the memory address received.

If the memory block offset being mapped is not the memory block, offset referenced by the lower order bits of the memory address received, the control circuit again determines if memory block offsets are actually being mapped into the corresponding cache offsets (i.e., cache fill in progress, non-dead cycle), step 82, at the next clock cycle, as described earlier.

If the memory block offset being mapped is the memory block offset referenced by the lower order bits of the memory address received, the control circuit determines if the data path to the CPU is available (step 90). The control circuit makes the determination in the same manner as described earlier.

Similarly, if the data path to the CPU is not available, the control circuit again determines if the memory block offsets are actually being mapped into the corresponding cache offsets (i.e., cache fill in progress, non-dead cycle), step 82, at the next cycle, as described earlier.

If the data path to CPU is available, the control circuit sends a data valid signal to the CPU (step 106), thereby causing the CPU to accept the next data word being provided by the main memory.

Figure 3:
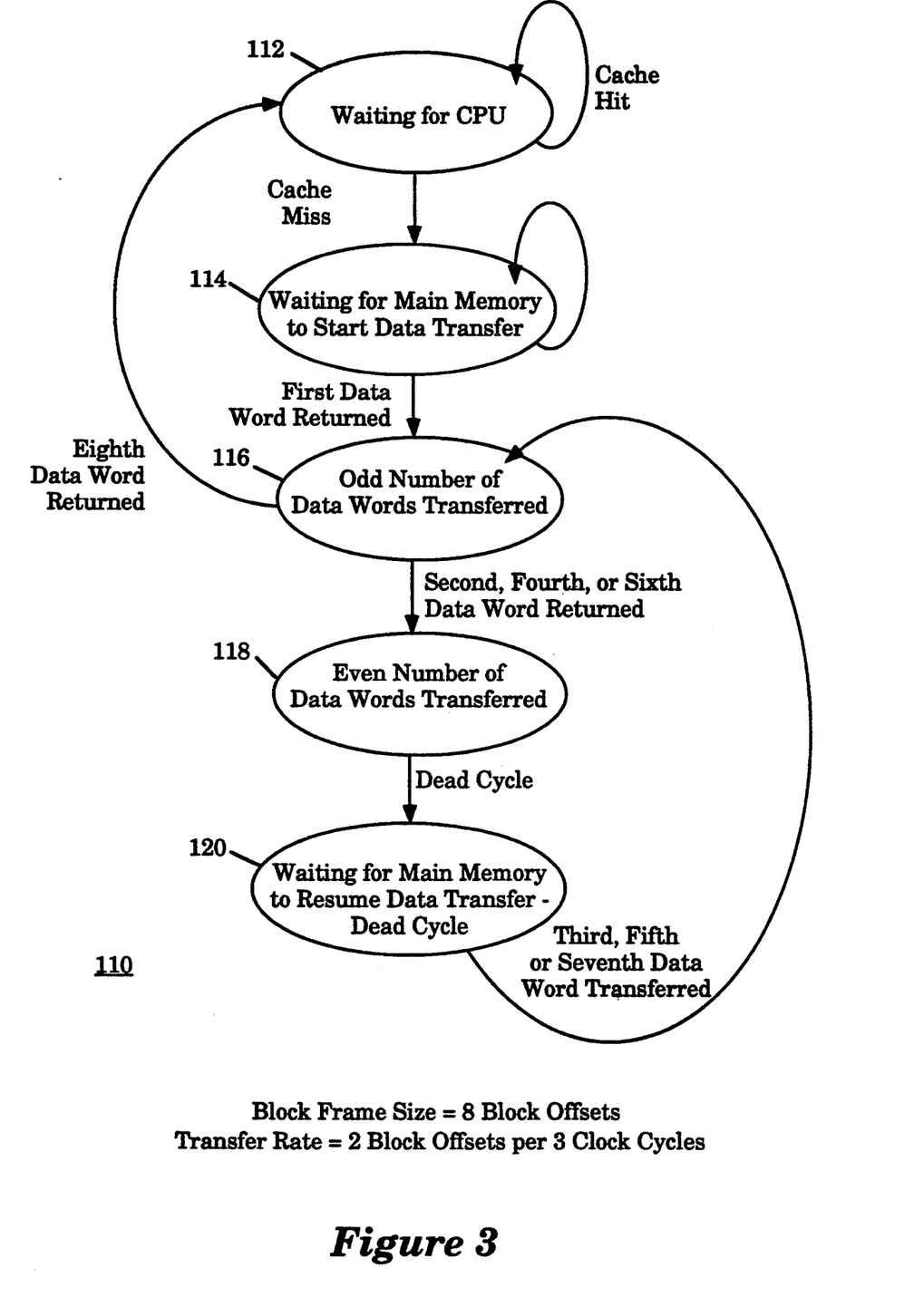
FIG. 3 shows an exemplary state diagram for the control circuit of the cache memory controller of the present invention, for an exemplary cache memory-main memory hierarchy.

Referring now to FIG. 3, an exemplary state diagram illustrating the states and the transition rules of the control circuit of the present invention for an exemplary cache memory-main memory hierarchy is shown. The exemplary cache memory-main memory hierarchy has a memory block frame size of eight memory block offsets and a transfer rate of two memory block offsets per three CPU clock cycles. Thus, the exemplary cache memory enters a dead cycle three times during a cache memory fill, once every three clock cycles.

At the end of any clock cycle, the control circuit for the exemplary cache memory-main memory hierarchy is in one of five possible states. The five possible states are the "waiting for CPU" state 112, "waiting for main memory to start data transfer" state 114, "odd number of data words transferred" state 116, "even number of data words transferred" state 118, and "waiting for main memory to resume data transfer-dead cycle" state 120.

Initially, the control circuit is in the "waiting for CPU" state 112. From the "waiting for CPU" state 112, the control circuit either remains in the "waiting for CPU" state 112 or enters the "waiting for main memory to start data transfer" state 114 at the end of the next clock cycle. The control circuit remains in the "waiting for CPU" state 112 if no memory address is received from the CPU or the memory address received results in a cache hit, during the next clock cycle. The control circuit enters the "waiting for main memory" state 114 if the memory address received from the CPU results in a cache miss, during the next clock cycle.

From the "waiting for main memory to start data transfer" state 114, the control circuit either remains in the "waiting for main memory to start data transfer" state 114 or enters the "odd number of data words transferred" state 116, at the end of the next clock cycle. The control circuit remains in the "waiting for main memory to start data transfer" state 114, if the main memory has not returned the first data word at the end of the next clock cycle. The control circuit enters the "odd number of data words transferred" state 116, if the main memory returns the first data word, during the next clock cycle. The control circuit also enters the "odd number of data words transferred" state 116 from the "waiting for main memory to resume data transfer-dead cycle" state 120, which will be discussed in further detail later.

From the "odd number of data words transferred" state 116, the control circuit either enters the "even number of data words transferred" state 118, or the "waiting for CPU" state 112, at the end of the next clock cycle. The control circuit enters the "even number of data words transferred" state 118, if the second, fourth or sixth data word is returned from main memory, during the next clock cycle. The control circuit enters the "waiting for CPU" state 112 if the eighth data word is returned from main memory during the next clock cycle.

From the "even number of data words transferred" state 118, the control circuit always enters the "waiting for main memory to resume data transfer-dead cycle" state 120, since this exemplary cache memory enters a dead cycle three times during a cache fill, once every three clock cycles.

From the "waiting for main memory to resume data transfer-dead cycle" state 120, the control circuit always enters the "odd number of data words transferred" state 116, since the exemplary main memory returns the third, the fifth or the seventh data word during the next clock cycle.

If the control circuit receives a new memory address from the CPU during the next clock cycle, while the control circuit is in the "odd number of data words transferred" state 116, the "even number of data words transferred" state 118, or the "waiting for main memory to resume data transfer" state 120, the new data word being fetched is either satisfied immediately with the next data word provided by the main memory, or later on at the next dead cycle, or later on at the completion of current cache fill, depending on the memory block frame and the memory block offset referenced by the new memory address received, as described earlier.

Referring back to FIG. 1, it will be appreciated that the address register 22, the plurality of fill registers 24-30 and the control circuit 30, may be implemented with well known integrated circuits. For further descriptions on registers and sequential logic, see Horowitz and Hill, *The Art of Electronics*, (Cambridge, 1989), pp. 523-541.

Additionally, the control circuit 32 may optionally elect to direct the cache memory to retrieve a data word being fetched by the CPU, and return the data word to the CPU, during a dead cycle, instead of waiting for the completion of the current cache fill, if the data word is stored in a cache location other than those cache locations of the mapping cache frame for the memory block frame currently being mapped. It will be appreciated that by doing so, the complexity of the control circuit 32 will increase substantially. Since it is highly likely that the subsequent data fetches after a cache read miss will be stored in memory locations corresponding to memory block offsets of the same memory block frames, the return in benefits for the increase in complexity may be limited.

While the invention has been described in terms of a preferred embodiment, those skilled in the art will recognize that the invention is not limited to the exemplary cache memory-main memory hierarchy described. The cache memory controller of the present invention can be practiced with modification and alteration within the spirit and scope of the appended claims to serve as a cache memory controller for a variety of cache memory-main memory hierarchies.

What is claimed is:

1. In a computer system comprising a central processing unit (CPU) and a cache and main memory hierarchy having a cache memory and a main memory, a method for fetching data for said CPU from said cache and main memory hierarchy that reduces CPU idle time, said method comprising the steps of:

receiving a first memory address from said CPU, said first memory address referencing a first memory location of said main memory where a first data word being fetched by said CPU is stored;

determining whether a first cache memory fill is in progress, said first cache memory fill being initiated due to a first cache read miss which resulted from previously receiving a second memory address from said CPU, said second memory address referencing a second memory location of said main memory where a second data word being fetched by said CPU is stored, said second data word having been subsequently retrieved from said cache and main memory hierarchy and returned to said CPU;

determining how to fetch said first data word from said cache memory and said main memory and return said first data word to said CPU, wherein said step of determining how to fetch and return said first data word comprises determining whether said first cache memory fill is in progress, and determining whether said first cache memory fill includes storing said first data word in said cache memory if said first cache memory fill is in progress;

sending signals to said CPU, said cache memory, and said main memory accordingly, thereby resulting in said first data word being retrieved from said cache and main memory hierarchy and returned to said CPU.

2. The method for fetching data as set forth in claim 1, wherein said first and second memory addresses reference said first and second memory locations with a first and second plurality of ordered bits respectively, said first and second plurality of ordered bits comprising a first and a second plurality of high order bits referencing a first and a second memory block frame respectively, and a first and a second plurality of low order bits referencing a first and a second memory block offset respectively, into said first and second memory block frames where said first and second memory locations are located respectively;

said first and second memory block frames having first and second $n_1$ memory block offsets corresponding to first and second $n_1$ memory locations for storing first and second $n_1$ data words respectively, wherein said first memory block offset is one of said first $n_1$ memory block offsets and said second memory block offset is one of said second $n_1$ memory block offsets, said first memory location is one of said first $n_1$ memory locations and said second memory location is one of said second $n_1$ memory locations, and said first data word is one of said first $n_1$ data words and said second data word is one of said second $n_1$ data words;

said first and second $n_1$ memory locations being referenced by first and second $n_1$ memory addresses comprising first and second $n_1$ pluralities of ordered bits, wherein said first memory address is one of said first $n_1$ memory addresses and said second memory address is one of said second $n_1$ memory addresses, and said first plurality of ordered bits is one of said first $n_1$ pluralities of ordered bits and said second plurality of ordered bits is one of said second $n_1$ pluralities of ordered bits; and said first and second $n_1$ pluralities of ordered bits comprising first and second $n_1$ pluralities of high ordered bits referencing said first and second memory block frames and first and second $n_1$ pluralities of low ordered bits referencing said first and second $n_1$ memory block offsets, wherein said first plurality of high order bits is one of said first $n_1$ pluralities of high order bits and said second plurality of high order bits is one of said second $n_1$ pluralities of high order bits, and said first plurality of low order bits is one of said first $n_1$ pluralities of low order bits and said second plurality of low order bits is one of said second $n_1$ pluralities of low order bits.

3. The method for fetching data as set forth in claim 2, wherein said first cache memory fill comprises mapping said second memory block frame into a first cache frame of said cache memory, said first cache frame being used for mapping at least said second memory block frame;

said mapping of said second memory block frame into said first cache frame comprising updating a first cache tag of said first cache frame to identify said second memory block frame as the memory block frame currently being mapped in said first cache frame;

said mapping of said second memory block frame into said first cache frame further comprising storing said second $n_1$ data words into first $n_1$ cache locations of said first cache frame, including storing said second data word into a first cache location of said first cache frame, wherein said first cache location is one of said first $n_1$ cache locations;

said first $n_1$ cache locations being referenced by first $n_1$ cache addresses, including said first cache location being referenced by a first cache address, wherein said first cache address is one of said first $n_1$ cache addresses;

said first $n_1$ cache addresses comprising third $n_1$ pluralities of ordered bits, including said first cache address comprising a third plurality of ordered bits, wherein said third plurality of ordered bits is one of said third $n_1$ pluralities of ordered bits; and said third $n_1$ pluralities of ordered bits comprising third $n_1$ pluralities of high order bits referencing said first cache frame, and third $n_1$ pluralities of low order bits referencing first $n_1$ cache offsets into said first cache frame, where said first $n_1$ cache locations are located, including said third plurality of ordered bits comprising a third plurality of high order bits referencing said first cache frame, and a third plurality of low order bits referencing a first cache offset into said first cache frame, where said first cache location is located, wherein said first cache offset is one of said first $n_1$ cache offsets, said third plurality of high order bits is one of said third $n_1$ pluralities of high order bits, and said third plurality of low order bits is one of said third $n_1$ pluralities of low order bits.

4. The method for fetching data as set forth in claim 3, wherein said second $n_1$ data words are written into said first $n_1$ cache locations in a pre-determined manner such that said second data word is written into said first cache location first.

5. The method for fetching data as set forth in claim 4, wherein said second $n_1$ data-words are written into said first $n_1$ cache locations in multiple bursts of $n_2$ data words per $n_3$ clock cycles, where $n_1$ is divisible by $n_2$, thereby resulting in $n_4$ dead cycles per $n_3$ clock cycles during said first cache memory fill.

6. The method for fetching data as set forth in claim 5, wherein $n_1$ equals eight, $n_2$ equals two, $n_3$ equals three, and $n_4$ equals one.

7. The method for fetching data as set forth in claim 5, wherein whether said first cache memory fill is in progress is determined based on a plurality of internal control states, said internal control states comprising a first control state of waiting for a next memory address from said CPU, a second control state of waiting for said main memory to start transferring data words for said first cache memory fill, $n_2$ control states of indicating a number of data words transferred so far for said first cache memory fill, and $n_4$ control states of waiting for said main memory to resume transferring data words for said first cache memory fill, wherein during said first control state, said first cache memory fill is not in progress, and during each of the other control states, said first cache memory fill is in progress, and during each of said $n_2$ control states, one of said second $n_1$ data words is being stored in one of said first $n_1$ cache locations, and during each of said $n_4$ control states, one of said second $n_1$ data words is not being stored in one of said first $n_1$ cache locations.

8. The method for fetching data as set forth in claim 5, wherein if said first cache memory fill is not in progress said step of determining how to fetch and return said first data word to said CPU further comprises determining whether said first memory address results in a second cache read miss;

said first memory address not resulting in a second cache read miss if said first memory block frame is currently mapped in a second cache frame of said cache memory, said second cache frame being used for mapping at least said first memory block frame;

said second cache frame comprising a second cache tag identifying said first memory block frame, and second $n_1$ cache locations storing said first $n_1$ data words, including a second cache location storing said first data word, wherein said second cache location is one of said second $n_1$ cache locations, if said first memory block frame is currently mapped in said second cache frame;

said second $n_1$ cache locations being referenced by second $n_1$ cache addresses, including said second cache location being referenced by a second cache address, wherein said second cache address is one of said second $n_1$ cache addresses;

said second $n_1$ cache addresses comprising fourth $n_1$ pluralities of ordered bits, including said second cache address comprising a fourth plurality of ordered bits, wherein said fourth plurality of ordered bits is one of said fourth $n_1$ pluralities of ordered bits; and said fourth $n_1$ pluralities of ordered bits comprising fourth $n_1$ pluralities of high order bits referencing said second cache frame, and fourth $n_1$ pluralities of low order bits referencing second $n_1$ cache offsets into said second cache frame, where said second $n_1$ cache locations are located, including said fourth plurality of ordered bits comprising a fourth plurality of high order bits referencing said second cache frame, and a fourth plurality of low order bits referencing a second cache offset into said second cache frame, where said second cache location is located, wherein said second cache offset is one of said second $n_1$ cache offsets, said fourth plurality of high order bits is one of said fourth $n_1$ pluralities of high order bits, and said fourth plurality of low order bits is one of said fourth $n_1$ pluralities of low order bits.

9. The method for fetching data as set forth in claim 5, wherein if said first cache memory fill is not in progress, and said first memory address does not result in a second cache read miss, signals are sent to said cache memory and said CPU, thereby resulting in said first data word being retrieved from said cache memory and returned to said CPU, said signals comprising, a read signal and a second cache address being sent to said cache memory, said read signal and second cache address causing said cache memory to retrieve said first data word from a second cache location and provide said first data word to said CPU, and a data valid signal being sent to said CPU indicating said first data word is being provided to said CPU, said data valid signal causing said CPU to accept said first data word;

said second cache address comprising a fourth plurality of ordered bits, said fourth plurality of ordered bits comprising a fourth plurality of high order bits referencing a second cache frame, and a fourth plurality of low order bits referencing a second cache offset into said second cache frame where said second cache location is located.

10. The method for fetching data as set forth in claim 5, wherein if said first cache memory fill is not in progress, and said first memory address results in a second cache read miss, signals are sent to said main memory, said cache memory and said CPU, thereby resulting in a second cache memory fill being initiated for said first memory block frame, and said first data word being returned to said CPU simultaneous with said first data word being written into said cache memory, said signals comprising, a read signal and said first memory address being sent to said main memory, said read signal and first memory address causing said main memory to provide said first $n_1$ data words to said cache memory and said CPU simultaneously, a write signal and second $n_1$ cache addresses being sent to said cache memory, said write signal and said cache address causing said cache memory to store said first $n_1$ data words into second $n_1$ cache locations, and a data valid signal being sent to said CPU indicating said first data word is being provided to said CPU, said data valid signal causing said CPU to accept said first data word;

said second $n_1$ cache addresses comprising fourth $n_1$ pluralities of ordered bits, said fourth $n_1$ pluralities of ordered bits comprising fourth $n_1$ pluralities of high order bits referencing a second cache frame, and fourth $n_1$ pluralities of low order bits referencing second $n_1$ cache offsets into said second cache frame where said second $n_1$ cache locations are located.

11. The method for fetching data as set forth in claim 5, wherein if said first cache memory fill is in progress, said first and second memory block frames are the same memory block frame, one of said second $n_1$ data words is not being stored into one of said first $n_1$ cache locations, and said first data word is stored in a second cache location of said first cache frame, signals are sent to said cache memory and said CPU, thereby resulting in said first data word being retrieved from said cache memory and returned to said CPU, said signals comprising, a read signal and a second cache address being sent to said cache memory, said read signal and second cache address causing said cache memory to retrieve said first data word from said second cache location and provide said first data word to said CPU, and a data valid signal being sent to said CPU indicating said first data word is being provided to said CPU, said data valid signal causing said CPU to accept said first data word;

said second cache address comprising a fourth plurality of ordered bits, said fourth plurality of ordered bits comprising a fourth plurality of high order bits referencing said first cache frame, and a fourth plurality of low order bits referencing a second cache offset into said first cache frame where said second cache location is located.

12. The method for fetching data as set forth in claim 5, wherein if said first cache memory fill is in progress, said first and second memory block frames are the same memory block frame, one of said second $n_1$ data words is being stored into one of said first $n_1$ cache locations, and said first data word is the next data word being stored in a second cache location of said first cache frame, signals are sent to said cache memory and said CPU, thereby resulting in said first data word being returned to said CPU simultaneous with said first data word being written into said cache memory, said signals comprising, a data valid signal being sent to said CPU indicating said first data word is being provided to said CPU, said data valid signal causing said CPU to accept said first data word simultaneous with said first data word being written into said second cache location.

13. The method for fetching data as set forth in claim 5, wherein if said first cache memory fill is in progress, said step of determining how to fetch and return said first data word to said CPU further comprises determining whether said first and second memory block frames are the same memory block frame;

said first and second memory block frames being the same if a memory block frame fill pointer points to said first memory block frame, said memory block frame fill pointer being used to point to the memory block frame currently being mapped;

said memory block frame fill pointer being set to said first plurality of high order bits if said memory block frame fill pointer points to said first memory block frame, wherein said memory block fill pointer was set to said first plurality of high order bits at the beginning of said first cache memory fill currently in progress if said first plurality of high order bits equals said second plurality of high order bits.

14. The method for fetching data as set forth in claim 13, wherein if said first cache memory fill is in progress, and said first and second memory block frames are different memory block frames, said step of determining how to fetch and return said first data word to said CPU further comprises using control circuitry to determine whether said first cache memory fill is completed by repeatedly determining whether said first cache memory fill is in progress, and upon the completion of said first cache memory fill, determining whether said first memory address results in a second cache read miss.

15. The method for fetching data as set forth in claim 13, wherein if said first cache memory fill is in progress, and said first and second memory block frames are the same memory block frame, said step of determining how to fetch and return said first data word to said CPU further comprises determining whether one of said second $n_1$ data words is in the process of being stored into one of said first $n_1$ cache locations;

the determination of whether one of said second $n_1$ data words is in the process of being stored into one of said first $n_1$ cache locations being based on a plurality of internal control states; and said internal control states comprising a first control state of waiting for a next memory address from said CPU, a second control state of waiting for said main memory to start transferring data words for said first cache memory fill, $n_2$ control states of indicating a number of data words transferred so far for said first cache memory fill, and $n_4$ control states of waiting for said main memory to resume transferring data words for said first cache memory fill, wherein during each of said $n_2$ control states, one of said second $n_1$ data words is being stored in one of said first $n_1$ cache locations, and during each of said $n_4$ control states, one of said second $n_1$ data words is not being stored in one of said first $n_1$ cache locations.

16. The method for fetching data as set forth in claim 15, wherein if said first cache memory fill is in progress, said first and second memory block frames are the same memory block frame, and one of said second $n_1$ data words is not in the process of being stored into one of said first $n_1$ cache locations, said step of determining how to fetch and return said first data word to said CPU further comprises determining whether said first data word is currently stored in a second cache location of said first cache frame;

said first data word being currently stored in said second cache location if a bit, corresponding to said first memory block offset, in a vector of valid memory block offset bits, indicates said first memory block offset is valid, said vector of valid memory block offset bits comprising $n_1$ bits corresponding to the $n_1$ memory block offsets of the memory block frame currently being mapped, and being used to indicate which of the $n_1$ memory block offsets of the memory block frame currently being mapped have been mapped;

said bit corresponding to said first memory block offset; being set when said first memory block offset is mapped, wherein said first memory block offset is valid if said bit corresponding to said first memory block offset is set.

17. The method for fetching data as set forth in claim 15, wherein if said first cache memory fill is in progress, said first and second memory block frames are the same memory block frame, and one of said second $n_1$ data words is in the process of being stored into one of said first $n_1$ cache locations, said step of determining how to fetch and return said first data word to said CPU further comprises determining whether said first data word is currently being stored into a second cache location of said first cache frame;

said first data word currently being stored into said second cache location if a memory block offset fill pointer points to said first memory block offset, said memory block offset fill pointer being used to point to a data word of the memory block frame being currently mapped, which is currently being stored;

said memory block offset fill pointer being set to said first plurality of low order bits if said memory block offset fill pointer points to said first memory block offset, wherein said memory block offset fill pointer is set to equal said first plurality of low order bits after a memory block offset preceding said first memory block offset has been mapped.

18. A cache memory controller for fetching data for a central processing unit (CPU) of a computer system from a cache and main memory hierarchy of the computer system that reduces CPU idle time, said memory hierarchy including a cache memory and a main memory, said cache memory controller comprising:

an address register coupled to said CPU for receiving a first memory address from said CPU, said first memory address indicating a first memory location of said main memory where a first data word being fetched by said CPU is stored; and control circuitry coupled to said address register, said CPU, said cache memory and said main memory for determining whether a first cache memory fill is in progress, determining how to fetch said first data word from said cache memory and said main memory and return said first data word to said CPU, wherein said determining how to fetch and return said first data word comprises determining whether said first cache memory fill is in progress, and determining whether said first cache memory fill includes storing said first data word in said cache memory if said first cache memory fill is in progress, and sending signals to said CPU, said cache memory, and said main memory accordingly, thereby resulting in said first data word being retrieved from said cache and main memory hierarchy and returned to said CPU, said CPU being coupled to said cache memory and said main memory;

said first cache memory fill being initiated due to a first cache read miss which resulted from previously receiving a second memory address from said CPU, said second memory address indicating a second memory location of said main memory where a second data word being fetched by said CPU is stored, said second data word having been subsequently retrieved from said cache and main memory hierarchy and returned to said CPU.

19. The cache memory controller for fetching data as set forth in claim 18, wherein said first and second memory addresses reference said first and second memory locations with a first and second plurality of ordered bits respectively, said first and second plurality of ordered bits comprising a first and second plurality of high order bits referencing first and second memory block frames, respectively, and a first and second plurality of low order bits referencing first and second memory block offsets respectively, into said first and second memory block frames where said first and second memory locations are located respectively;

said first and second memory block frames having first and second $n_1$ memory block offsets corresponding to first and second $n_1$ memory locations for storing first and second $n_1$ data words respectively, wherein said first memory block offset is one of said first $n_1$ memory block offsets and said second memory block offset is one of said second $n_1$ memory block offsets, said first memory location is one of said first $n_1$ memory locations and said second memory location is one of said second $n_1$ memory locations, and said first data word is one of said first $n_1$ data words and said second data word is one of said second $n_1$ data words;

said first and second $n_1$ memory locations being referenced by first and second $n_1$ memory addresses comprising first and second $n_1$ pluralities of ordered bits, wherein said first memory address is one of said first $n_1$ memory addresses and said second memory address is one of said second $n_1$ memory addresses, and said first plurality of ordered bits is one of said first $n_1$ pluralities of ordered bits and said second plurality of ordered bits is one of said second $n_1$ pluralities of ordered bits; and said first and second $n_1$ pluralities of ordered bits comprising first and second $n_1$ pluralities of high ordered bits referencing said first and second memory block frames and first and second $n_1$ pluralities of low ordered bits referencing said first and second $n_1$ memory block offsets, wherein said first plurality of high order bits is one of said first $n_1$ pluralities of high order bits and said second plurality of high order bits is one of said second $n_1$ pluralities of high order bits, and said first plurality of low order bits is one of said first $n_1$ pluralities of low order bits and said second plurality of low order bits is one of said second $n_1$ pluralities of low order bits.

20. The cache memory controller for fetching data as set forth in claim 19, wherein said first cache memory fill comprises mapping said second memory block frame into a first cache frame of said cache memory, said first cache frame being used for mapping at least said second memory block frame;

said mapping of said second memory block frame into said first cache frame comprising updating a first cache tag of said first cache frame to identify said second memory block frame as the memory block frame currently being mapped in said first cache frame;

said mapping of said second memory block frame into said first cache frame further comprising storing said second $n_1$ data words into first $n_1$ cache locations of said first cache frame, including storing said second data word into a first cache location of said first cache frame, wherein said first cache location is one of said first $n_1$ cache locations;

said first $n_1$ cache locations being referenced by first $n_1$ cache addresses, including said first cache location being referenced by a first cache address, wherein said first cache address is one of said first $n_1$ cache addresses;

said first $n_1$ cache addresses comprising third $n_1$ pluralities of ordered bits, including said first cache address comprising a third plurality of ordered bits, wherein said third plurality of ordered bits is one of said third $n_1$ pluralities of ordered bits; and said third $n_1$ pluralities of ordered bits comprising third $n_1$ pluralities of high order bits referencing said first cache frame, and third $n_1$ pluralities of low order bits referencing first $n_1$ cache offsets into said first cache frame, where said first $n_1$ cache locations are located, including said third plurality of ordered bits comprising a third plurality of high order bits referencing said first cache frame, and a third plurality of low order bits referencing a first cache offset into said first cache frame, where said first cache location is located, wherein said first cache offset is one of said first $n_1$ cache offsets, said third plurality of high order bits is one of said third $n_1$ pluralities of high order bits, and said third plurality of low order bits is one of said third $n_1$ pluralities of low order bits.

21. The cache memory controller for fetching data as set forth in claim 20, wherein said second $n_1$ data words are written into said first $n_1$ cache locations in a predetermined manner such that said second data word is written into said first cache location first.

22. The cache memory controller for fetching data as set forth in claim 21, wherein said second $n_1$ data words are written into said first $n_1$ cache locations in multiple bursts of $n_2$ data words per $n_3$ clock cycles, where $n_1$ is divisible by $n_2$, thereby resulting in $n_4$ dead cycles per $n_3$ clock cycles during said first cache memory fill.

23. The cache memory controller for fetching data as set forth in claim 22, wherein $n_1$ equals eight, $n_2$ equals two, $n_3$ equals three, and $n_4$ equals one.

24. The cache memory controller for fetching data as set forth in claim 22, wherein said control circuitry determines whether said first cache memory fill is in progress based on a plurality of internal control states;

said internal control states comprising a first control state of waiting for a next memory address from said CPU, a second control state of waiting for said main memory to start transferring data words for said first cache memory fill, $n_2$ control states of indicating a number of data words transferred so far for said first cache memory fill, and $n_4$ control states of waiting for said main memory to resume transferring data words for said first cache memory fill, wherein during said first control state, said first cache memory fill is not in progress, and during each of the other control states, said first cache memory fill is in progress, and during each of said $n_2$ control states, one of said second $n_1$ data words is being stored in one of said first $n_1$ cache locations, and during each of said $n_4$ control states, one of said second $n_1$ data words is not being stored in one of said first $n_1$ cache locations.

25. The cache memory controller for fetching data as set forth in claim 22, wherein if said first cache memory fill is not in progress, said control circuitry determines how to fetch and return said first data word to said CPU by determining whether said first memory address results in a second cache read miss;

said first memory address not resulting in a second cache read miss if said first memory block frame is currently mapped in a second cache frame of said cache memory, said second cache frame being used for mapping at least said first memory block frame;

said second cache frame comprising a second cache tag identifying said first memory block frame, and second $n_1$ cache locations storing said first $n_1$ data words, including a second cache location storing said first data word, wherein said second cache location is one of said second $n_1$ cache locations, if said first memory block frame is currently mapped in said second cache frame;

said second $n_1$ cache locations being referenced by second $n_1$ cache addresses, including said second cache location being referenced by a second cache address, wherein said second cache address is one of said second $n_1$ cache addresses;

said second $n_1$ cache addresses comprising fourth $n_1$ pluralities of ordered bits, including said second cache address comprising a fourth plurality of ordered bits, wherein said fourth plurality of ordered bits is one of said fourth $n_1$ pluralities of ordered bits; and said fourth $n_1$ pluralities of ordered bits comprising fourth $n_1$ pluralities of high order bits referencing said second cache frame, and fourth $n_1$ pluralities of low order bits referencing second $n_1$ cache offsets into said second cache frame, where said second $n_1$ cache locations are located, including said fourth plurality of ordered bits comprising a fourth plurality of high order bits referencing said second cache frame, and a fourth plurality of low order bits referencing a second cache offset into said second cache frame, where said second cache location is located, wherein said second cache offset is one of said second $n_1$ cache offsets, said fourth plurality of high order bits is one of said fourth $n_1$ pluralities of high order bits, and said fourth plurality of low order bits is one of said fourth $n_1$ pluralities of low order bits.

26. The cache memory controller for fetching data as set forth in claim 22, wherein if said first cache memory fill is not in progress, and said first memory address does not result in a second cache read miss, said control circuitry sends signals to said cache memory and said CPU, thereby resulting in said first data word being retrieved from said cache memory and returned to said CPU, said signals comprising, a read signal and a second cache address being sent to said cache memory, said read signal and second cache address causing said cache memory to retrieve said first data word from a second cache location and provide said first data word to said CPU, and a data valid signal being sent to said CPU indicating said first data word is being provided to said CPU, said data valid signal causing said CPU to accept said first data word;

said second cache address comprising a fourth plurality of ordered bits, said fourth plurality of ordered bits comprising a fourth plurality of high order bits referencing a second cache frame, and a fourth plurality of low order bits referencing a second cache offset into second cache frame where said second cache location is located.

27. The cache memory controller for fetching data as set forth in claim 22, wherein if said first cache memory fill is not in progress, and said first memory address results in a second cache read miss, said control circuitry sends signals to said main memory, said cache memory and said CPU, thereby resulting in a second cache memory fill being initiated for said first memory block frame, and said first data word being returned to said CPU simultaneous with said first data word being written into said cache memory, said signals comprising, a read signal and said first memory address being sent to said main memory, said read signal and first memory address causing said main memory to provide said first $n_1$ data words to said cache memory and said CPU simultaneously, a write signal and second $n_1$ cache addresses being sent to said cache memory, said write signal and said cache addresses causing said cache memory to store said first $n_1$ data words into second $n_1$ cache locations, and a data valid signal being sent to said CPU indicating said first data word is being provided to said CPU, said data valid signal causing said CPU to accept said first data word;

said second $n_1$ cache addresses comprising fourth $n_1$ pluralities of ordered bits, said fourth $n_1$ pluralities of ordered bits comprising fourth $n_1$ pluralities of high order bits referencing a second cache frame, and fourth $n_1$ pluralities of low order bits referencing second $n_1$ cache offsets into second cache frame where said second $n_1$ cache locations are located.

28. The cache memory controller for fetching data as set forth in claim 22, wherein if said first cache memory fill is in progress, said first and second memory block flames are the same memory block frame, one of said second $n_1$ data words is not being stored into one of said first $n_1$ cache locations, and said first data word is stored in a second cache location of said first cache frame, said control circuitry sends signals to said cache memory and said CPU, thereby resulting in said first data word being retrieved from said cache memory and returned to said CPU, said signals comprising, a read signal and a second cache address being sent to said cache memory, said read signal and second cache address causing said cache memory to retrieve said first data word from said second cache location and provide said first data word to said CPU, and a data valid signal being sent to said CPU indicating said first data word is being provided to said CPU, said data valid signal causing said CPU to accept said first data word;

said second cache address comprising a fourth plurality of ordered bits, said fourth plurality of ordered bits comprising a fourth plurality of high order bits referencing said first cache frame, and a fourth plurality of low order bits referencing a second cache offset into said first cache frame where said second cache location is located.

29. The cache memory controller for fetching data as set forth in claim 22, wherein if said first cache memory fill is in progress, said first and second memory block frames are the same memory block frame, one of said second $n_1$ data words is being stored into one of said first $n_1$ cache locations, and said first data word is the next data word being stored in a second cache location of said first cache frame, said control circuitry sends signals to said cache memory and said CPU, thereby resulting in said first data word being returned to said CPU simultaneous with said first data word being written into said cache memory, said signals comprising, a data valid signal being sent to said CPU indicating said first data word is being provided to said CPU, said data valid signal causing said CPU to accept said first data word simultaneous with said first data word being written into said second cache location.

30. The cache memory controller for fetching data as set forth in claim 22, wherein said cache memory controller further comprises a first fill register coupled to said control circuitry for storing a memory block frame fill pointer, said memory block frame fill pointer being used to point to the memory block frame currently being mapped;

said control circuitry determining how to fetch and return said first data word to said CPU by determining whether said first and second memory block frames are the same memory block frame if said first cache memory fill is in progress, said first and second memory block frames being the same if said memory block frame fill pointer points to said first memory block frame;

said memory block frame fill pointer being set to said first plurality of high order bits if said memory block frame fill pointer points to said first memory block frame, wherein said memory block fill pointer was set to said first plurality of high order bits at the beginning of said first cache memory fill currently in progress by said control circuitry if said first plurality of high order bits equals said second plurality of high order bits.

31. The cache memory controller for fetching data as set forth in claim 30, wherein if said first cache memory fill is in progress, and said first and second memory block frames are different memory block frames, said control circuitry determines how to fetch and return said first data word to said CPU by further determining whether said first memory address results in a second cache read miss, at the completion of said first cache memory fill, the completion of said first cache memory fill being detected by said control circuitry by repeatedly determining whether said first cache memory fill is in progress.

32. The cache memory controller for fetching data as set forth in claim 30, wherein if said first cache memory fill is in progress, and said first and second memory block frames are the same memory block frame, said control circuitry determines how to fetch and return said first data word to said CPU by further determining whether one of said second $n_1$ data words is in the process of being stored into one of said first $n_1$ cache locations;

the determination of whether one of said second $n_1$ data words is in the process of being stored into one of said first $n_1$ cache locations being made by said control circuitry based on a plurality of internal control states;

said internal control states comprising a first control state of waiting for a next memory address from said CPU, a second control state of waiting for said main memory to start transferring data words for said first cache memory fill, $n_2$ control states of indicating a number of data words transferred so far for said first cache memory fill, and $n_4$ control states of waiting for said main memory to resume transferring data words for said first cache memory fill, wherein during each of said $n_2$ control states, one of said second $n_1$ data words is being stored in one of said first $n_1$ cache locations, and during each of said $n_4$ control states, one of said second $n_1$ data words is not being stored in one of said first $n_1$ cache locations.

33. The cache memory controller for fetching data as set forth in claim 32, wherein said cache controller further comprises a second fill register coupled to said control circuitry for storing a vector of valid memory block offset bits, said vector of valid memory block offset bits comprising $n_1$ bits corresponding to the $n_1$ memory block offsets of the memory block frame currently being mapped, and being used to indicate which of the $n_1$ memory block offsets of the memory block frame currently being mapped have been mapped;

said control circuitry determining how to fetch and return said first data word to said CPU by further determining whether said first data word is currently stored in a second cache location of said first cache frame if said first cache memory fill is in progress, said first and second memory block frames are the same memory block frame, and one of said second $n_1$ data words is not in the process of being stored into one of said first $n_1$ cache locations, said first data word being currently stored in said second cache location if a bit, corresponding to said first memory block offset, in said vector of valid memory block offset bits, indicates said first memory block offset is valid;

said bit corresponding to said first memory block offset being set by said control circuitry when said first memory block offset is mapped, wherein said first memory block offset is valid if said bit corresponding to said first memory block offset is set.

34. The cache memory controller for fetching data as set forth in claim 32, wherein said cache memory controller comprises a third fill register coupled to said control circuitry for storing a memory block offset fill pointer, said memory block offset fill pointer being used to point to a word of the memory block frame being currently mapped, which is currently being stored;

said control circuitry determining how to fetch and return said first data word to said CPU by further determining whether said first data word is currently being stored into a second cache location of said first cache frame if said first cache memory fill is in progress, said first and second memory block frames are the same memory block frame, and one of said second $n_1$ data words is in the process of being stored into one of said first $n_1$ cache locations, said first data word currently being stored into said second cache location if a memory block offset fill pointer points to said first memory block offset;

said memory block offset fill pointer being set to said first plurality of low order bits if said memory block offset fill pointer points to said first memory block offset, wherein said memory block offset fill pointer is set to equal said first plurality of low order bits by said control circuitry after a memory block offset preceding said first memory block offset has been mapped.

* * * * *

UNITED STATES PATENT AND TRADEMARK OFFICE
CERTIFICATE OF CORRECTION

PATENT NO. : 5,386,526
DATED : January 31, 1995
INVENTOR(S) : Mitra, et al

It is certified that error appears in the above-indentified patent and that said Letters Patent is hereby corrected as shown below:

On the title page item [75], delete "Samir Mitra, Milpitas; Renukanthan Raman, Sunnyvale; Joseph Petollno, Palo Alto, all of Calif." and insert --Samir Mitra, Milpitas; Renukanthan Raman, Sunnyvale; Joseph Petolino, Palo Alto, all of Calif.--

Signed and Sealed this

Eighth Day of August, 1995

*Attest:*

BRUCE LEHMAN

*Attesting Officer*     *Commissioner of Patents and Trademarks*